US011367879B2

(12) United States Patent
Shintani et al.

(10) Patent No.: US 11,367,879 B2
(45) Date of Patent: Jun. 21, 2022

(54) ELECTRODE CATALYST OF ELECTROCHEMICAL DEVICE, ELECTRODE CATALYST LAYER OF ELECTROCHEMICAL DEVICE, MEMBRANE ELECTRODE ASSEMBLY OF ELECTROCHEMICAL DEVICE, ELECTROCHEMICAL DEVICE, METHOD FOR MANUFACTURING ELECTRODE CATALYST OF ELECTROCHEMICAL DEVICE, AND METHOD FOR MANUFACTURING MEMBRANE ELECTRODE ASSEMBLY OF ELECTROCHEMICAL DEVICE

(71) Applicant: Panasonic Intellectual Property Management Co., Ltd., Osaka (JP)

(72) Inventors: Haruhiko Shintani, Osaka (JP); Nobuhiro Miyata, Osaka (JP); Tomokatsu Wada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 222 days.

(21) Appl. No.: 16/597,812

(22) Filed: Oct. 9, 2019

(65) Prior Publication Data
US 2020/0127299 A1 Apr. 23, 2020

(30) Foreign Application Priority Data
Oct. 17, 2018 (JP) .............................. JP2018-195908

(51) Int. Cl.
*H01M 4/02* (2006.01)
*H01M 4/90* (2006.01)
(Continued)

(52) U.S. Cl.
CPC ....... *H01M 4/9083* (2013.01); *H01M 4/8657* (2013.01); *H01M 8/1004* (2013.01); *H01M 8/1018* (2013.01); *H01M 2008/1095* (2013.01)

(58) Field of Classification Search
CPC .... H01M 4/9083; H01M 4/9075; H01M 4/92; H01M 4/9041; H01M 4/8657;
(Continued)

(56) References Cited

U.S. PATENT DOCUMENTS

| 2016/0064744 | A1 | 3/2016 | Mashio et al. |
| 2016/0093892 | A1 | 3/2016 | Hori et al. |
| 2018/0166697 | A1* | 6/2018 | Yamamoto .............. C01B 32/00 |

FOREIGN PATENT DOCUMENTS

| EP | 2990116 A1 | 3/2016 |
| EP | 3349281 A1 | 7/2018 |

(Continued)

OTHER PUBLICATIONS

Extended European Search Report dated Mar. 20, 2020 for the related European Patent Application No. 19202706.8.

*Primary Examiner* — Raymond Alejandro
(74) *Attorney, Agent, or Firm* — McDermott Will & Emery LLP

(57) ABSTRACT

An electrode catalyst of an electrochemical device according to the present disclosure is an electrode catalyst of an electrochemical device, the electrode catalyst including a mesoporous material; and catalyst metal particles supported at least in the mesoporous material. Before supporting the catalyst metal particles, the mesoporous material includes mesopores having a mode radius of 1 to 25 nm and a pore volume of 1.0 to 3.0 cm³/g, and number density of the catalyst metal particles supported in the mesopores is lower at an outer side of the mesoporous material than number (Continued)

density of the catalyst metal particles supported in the mesopores at an inner side thereof.

9 Claims, 6 Drawing Sheets

(51) Int. Cl.
*H01M 4/86* (2006.01)
*H01M 8/1004* (2016.01)
*H01M 8/1018* (2016.01)
*H01M 8/10* (2016.01)

(58) Field of Classification Search
CPC ............ H01M 4/8642; H01M 4/8605; H01M 8/1004; H01M 8/1018; H01M 2008/1095
See application file for complete search history.

(56) References Cited

FOREIGN PATENT DOCUMENTS

| | | |
|---|---|---|
| WO | 2014/175106 | 10/2014 |
| WO | 2014/185498 | 11/2014 |

\* cited by examiner

FIG. 6

|  | EXAMPLE | COMPARATIVE EXAMPLE |
|---|---|---|
| MASS ACTIVITY AT 0.9 V | 199 A/g$_{Pt}$ | 149 A/g$_{Pt}$ |
| ELECTROCHEMICAL ACTIVE SURFACE AREA | 74.8 m$^2$/g$_{Pt}$ | 72.9 m$^2$/g$_{Pt}$ |
| DEGREE OF Pt ENCLOSURE | 1.06 | 0.81 |

ELECTRODE CATALYST OF
ELECTROCHEMICAL DEVICE,
ELECTRODE CATALYST LAYER OF
ELECTROCHEMICAL DEVICE, MEMBRANE
ELECTRODE ASSEMBLY OF
ELECTROCHEMICAL DEVICE,
ELECTROCHEMICAL DEVICE, METHOD
FOR MANUFACTURING ELECTRODE
CATALYST OF ELECTROCHEMICAL
DEVICE, AND METHOD FOR
MANUFACTURING MEMBRANE
ELECTRODE ASSEMBLY OF
ELECTROCHEMICAL DEVICE

BACKGROUND

1. Technical Field

The present disclosure relates to an electrode catalyst used in an electrochemical device, an electrode catalyst layer containing the electrode catalyst, a membrane electrode assembly including the electrode catalyst layer, an electrochemical device using the membrane electrode assembly, a method for manufacturing an electrode catalyst layer of an electrochemical device, and a method for manufacturing a membrane electrode assembly of an electrochemical device.

2. Description of the Related Art

As one example of an electrochemical device, a fuel cell has been known. For example, a solid polymer fuel cell includes a membrane electrode assembly (MEA) which performs an electrochemical reaction (power generation reaction) between a fuel gas containing hydrogen and an oxidant gas containing oxygen.

In general, an electrode catalyst layer forming the membrane electrode assembly is formed in such a way that a catalyst paste is formed by dispersing a catalyst supporting a catalyst metal, such as platinum, on an electrically conductive material, such as carbon black, and a polymer electrolyte (hereinafter, referred to as "ionomer") having a proton conductivity in a solvent, such as water or an alcohol, and is then applied on a polymer electrolyte membrane or another base material, followed by drying.

In addition, in order to suppress poisoning of the catalyst metal by the ionomer, there has been also proposed a method in which catalyst metal particles are supported in a carrier formed of mesoporous carbon, and the carrier supporting the particles is covered with the ionomer (for example, see International Publication Nos. 2014/175106 and 2014/185498).

SUMMARY

One non-limiting and exemplary embodiment provides an electrode catalyst of an electrochemical device which is able to reduce poisoning of a catalyst metal by an ionomer, an electrode catalyst layer of an electrochemical device, a membrane electrode assembly of an electrochemical device, and an electrochemical device.

In one general aspect, the techniques disclosed here feature an electrode catalyst of an electrochemical device, the electrode catalyst comprising: a mesoporous material; and catalyst metal particles supported at least in the mesoporous material. In the electrode catalyst described above, before supporting the catalyst metal particles, the mesoporous material includes mesopores having a mode radius of 1 to 25 nm and a pore volume of 1.0 to 3.0 $cm^3/g$, and number density of the catalyst metal particles supported in the mesopores is lower at an outer side of the mesoporous material than number density of the catalyst metal particles supported in the mesopores at an inner side thereof.

The present disclosure has been formed as described above, and the poisoning of the catalyst metal by the ionomer can be reduced as compared to that in the past.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a table showing the performance and the physical characteristics of a cathode catalyst which uses the electrode catalyst layer of the example and those of the comparative example.

Figure 1:
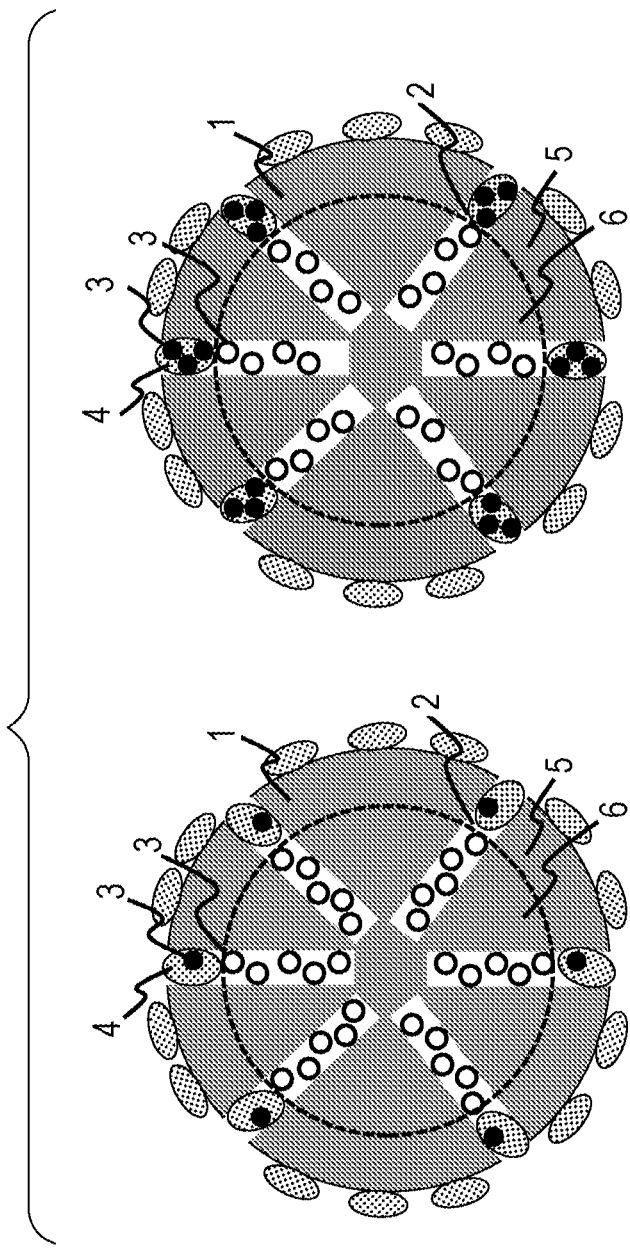
FIG. 1 is a schematic view showing an electrode catalyst of an example of the present disclosure and an electrode catalyst of a comparative example.

DETAILED DESCRIPTION (Underlying Knowledge Forming Basis of the Present Disclosure)

As described above, in general, the electrode catalyst layer of the membrane electrode assembly is formed in such a way that a catalyst paste is formed by dispersing a catalyst supporting a catalyst metal, such as platinum, on an electrically conductive material, such as carbon black, and an ionomer having a proton conductivity in a solvent, such as water or an alcohol, and is then applied on a polymer electrolyte membrane or another base material, followed by drying.

A microstructure (hereinafter, referred to as "three-phase interface structure) of the electrode catalyst layer formed as described above is the structure in which the ionomer covers the catalyst. In this three-phase interface structure, heretofore, in view of supply of protons to the surface of the catalyst metal, the contact between the catalyst metal and the ionomer has been believed to improve the performance. However, in recent years, it has been understood that by the contact with the ionomer, the catalyst metal is poisoned. Hence, conversely, it is pointed out that the contact between the catalyst metal and the ionomer degrades the performance.

To overcome the problem as described above, the above International Publication Nos. 2014/175106 and 2014/185498 have proposed a method to avoid the contact between the ionomer and the metal catalyst by enclosing the metal catalyst in a carbon carrier, such as mesoporous carbon, which includes pores having a large capacity.

However, through intensive research carried out by the present inventor, it was found that since the ionomer may partially intrude into mesopores in some cases, even if an electrode catalyst in which catalyst metal particles (such as Pt particles) are enclosed in the mesopores is used, poisoning of the catalyst metal by the ionomer may not be sufficiently prevented.

Accordingly, through intensive research on an electrode catalyst which reduces the poisoning of the catalyst metal by the ionomer, the present inventors found that among various inner portions of the mesoporous carbon, when the amount of catalyst metal particles supported at a portion in the vicinity of the surface of the mesoporous carbon into which the ionomer is liable to intrude is decreased, the poisoning of the catalyst metal can be reduced, and as a result, the present disclosure was made.

In addition, in this specification, the mesoporous carbon is defined as porous carbon which includes mesopores having a mode radius of 1 to 25 nm and which can freely control the pore structure by changing a template, a carbon source, and the like and/or by controlling synthetic conditions, such as a reaction temperature. In addition, a material used for the electrode catalyst layer of the present disclosure is not limited to the mesoporous carbon, and as long as the mode radius and the pore volume are the same as those of the mesoporous carbon described above, it is believed that even by another mesoporous material, an effect similar to that described above may also be obtained. The another mesoporous material other than the mesoporous carbon, for example, there may be mentioned a mesoporous material formed of an oxide of titanium, tin, niobium, tantalum, zirconium, aluminum, silicon, or the like.

Heretofore, since the size of an ionomer in a catalyst ink is several tens of nanometers, it has been believed that the ionomer cannot intrude into mesopores having a radius of 1 to 10 nm, and as a result, Pt particles, which are the catalyst metal particles, enclosed in the mesoporous carbon are not influenced by poisoning by the ionomer.

However, in practice, it was found that the ionomer may partially intrude into the mesopores in some cases. In addition, since the ionomer is liable to adsorb onto Pt particles, an ionomer which intrudes into the mesopores adsorbs onto Pt particles supported at a position in the vicinity of the surface among various inner portions of the mesoporous carbon, and as a result, the catalyst activity of the Pt particles is degraded.

Accordingly, it is believed that even in the mesoporous carbon, the Pt particles supported at a portion in the vicinity of the surface of the mesoporous carbon are influenced by the poisoning caused by the ionomer. FIG. 1 is a schematic view showing an electrode catalyst of an example of the present disclosure and an electrode catalyst of a comparative example. In particular, the left side of FIG. 1 is a schematic view showing the electrode catalyst of the example of the present disclosure, and the right side of FIG. 1 is a schematic view showing the electrode catalyst of the comparative example. In FIG. 1, a white circle indicates a catalyst metal particle 3 which is not influenced by the poisoning by an ionomer 4, and a black circle indicates a catalyst metal particle 3 influenced by the poisoning by the ionomer 4. In addition, a circle shown by a solid line enclosing the black circles and the white circles indicates a mesoporous carbon 1. In FIG. 1, a region from the surface of the mesoporous carbon to a dotted-line portion indicates a first region 5, and the inside from the dotted-line portion of the mesoporous carbon indicates a second region 6. As shown in FIG. 1, in the electrode catalyst of the example of the present disclosure which supports the ionomer 4, the number density of the catalyst metal particles 3 supported in the mesopores 2 present in the first region 5 of the mesoporous carbon 1 is lower than the number density of the catalyst metal particles 3 supported in the second region 6. In the comparative example, the number density of the catalyst metal particles 3 supported in the mesopores 2 present in the first region of the mesoporous carbon is higher than the number density of the catalyst metal particles 3 supported in the second region.

That is, as shown in FIG. 1, in the electrode catalyst of the example of the present disclosure which supports the ionomer 4, since the rate of the catalyst metal poisoned by the ionomer 4 is decreased as compared to that of the comparative example, the catalyst activity is believed to be improved.

Accordingly, an electrode catalyst of an electrochemical device according to a first aspect of the present disclosure comprises: a mesoporous material and catalyst metal particles supported at least in the mesoporous material, and before supporting the catalyst metal particles, the mesoporous material includes mesopores having a mode radius of 1 to 25 nm and a pore volume of 1.0 to 3.0 cm$^3$/g; and number density of the catalyst metal particles supported in the mesopores is lower at an outer side of the mesoporous material than number density of the catalyst metal particles supported in the mesopores at an inner side thereof.

By the structure as described above, compared to the case in the past, the poisoning of the catalyst metal by the ionomer can be suppressed.

In addition, the electrode catalyst of the electrochemical device according to the first aspect of the present disclosure is an electrode catalyst of an electrochemical device before the ionomer is supported.

In addition, as long as the number density of the catalyst metal particles supported in the mesopores is lower at the outer side of the mesoporous material than that at the inner side thereof, regardless of the second aspect which will be described below, any structure may be used. For example, the structure in which, from the inner side to the outer side of the mesoporous material, the number density of the catalyst metal particles supported in the mesopores is gradually decreased may also be used. The "gradually decreased" includes, for example, the case in which the number density of the catalyst metal particles is stepwise decreased at least three times.

In addition, in an electrode catalyst of an electrochemical device according to a second aspect of the present disclosure, the number density of the catalyst metal particles supported in the mesopores present in a first region which is a predetermined region from the surface of the mesoporous material to the inside thereof is lower than the number density of the catalyst metal particles supported in the mesopores present in a second region located inside than the first region.

In the case described above, the first region does not include the surface of the mesoporous carbon. In addition, the predetermined region may include a region in which the ionomer intrudes into the inside (mesopores). The predetermined region may include, for example, a region from the surface of the mesoporous carbon to a depth of 40 nm. The second region may be any region as long as being located inside than the first region. For example, the second region may be a region which is located inside than the first region and which is other than the first region. In this case, in a part of the second region, even if the number density of the catalyst metal particles is lower than the number density of the catalyst metal particles supported in the mesopores present in the first region, when the number density is higher as the entire second region (for example, as the average value) than the number density supported in the mesopores present in the first region, this case is also included in the second aspect.

In addition, according to an electrode catalyst of an electrochemical device of a third aspect of the present disclosure, in the electrode catalyst of the electrochemical device according to the second aspect, the number density of the catalyst metal particles supported in the mesopores in the first region is lower than that in the second region by 6% or more.

By the structure as described above, compared to the case in the past, the poisoning of the catalyst metal by the ionomer can be further suppressed.

In addition, according to an electrode catalyst of an electrochemical device of a fourth aspect of the present disclosure, in the electrode catalyst of the electrochemical device according to any one of the first to the third aspects, the mesoporous material may have an average particle diameter of 200 nm or more.

By the structure as described above, since the region in which the ionomer intrudes into the mesopores is decreased with respect to the pore volume of the mesopores, the rate of the catalyst metal influenced by the poisoning by the ionomer is decreased. Hence, when the average particle diameter is set to be 200 nm or more, for example, it is believed that the catalyst activity can be improved as compared to that of a related electrode catalyst layer.

In addition, according to an electrode catalyst of an electrochemical device of a fifth aspect of the present disclosure, in the electrode catalyst of the electrochemical device according to any one of the first to the fourth aspects, the mode radius of the mesopores may be 3 to 6 nm.

By the structure as described above, when the mode radius of the mesopores is 3 nm or more, a gas is likely to be supplied into the pores, and when the mode radius is 6 nm or less, the ionomer is not likely to intrude into the pores.

In addition, an electrode catalyst layer of an electrochemical device according to a six aspect of the present disclosure comprises: the electrode catalyst of the electrochemical device according to any one of the first to the fifth aspects; and an ionomer.

By the structure as described above, compared to the case in the past, the poisoning of the catalyst metal by the ionomer can be further suppressed.

In addition, according to an electrode catalyst layer of an electrochemical device of a seventh aspect of the present disclosure, the electrode catalyst layer of the electrochemical device according to the sixth aspect may further comprise at least one material selected from the group consisting of carbon black and carbon nanotubes.

By the structure as described above, the drainage of the electrode catalyst layer is improved.

In addition, according to an electrode catalyst layer of an electrochemical device of an eighth aspect of the present disclosure, in the electrode catalyst layer of the electrochemical device of the six or the seven aspect, the mesoporous material may include mesoporous carbon, and the ratio of the weight of the ionomer contained in the electrode catalyst to the total weight of carbon including the mesoporous carbon may be 0.7 to 0.9.

In addition, a membrane electrode assembly of an electrochemical device according to a ninth aspect of the present disclosure comprises a polymer electrolyte membrane; and a fuel electrode and an air electrode which are provided on two sides of the polymer electrolyte membrane and each of which includes an electrode catalyst layer and a gas diffusion layer, and the electrode catalyst layer of the air electrode at least includes the electrode catalyst layer of the electrochemical device according to any one of the six to the eighth aspects.

By the structure as described above, compared to the case in the past, the poisoning of the catalyst metal by the ionomer can be suppressed.

In addition, an electrochemical device according to a tenth aspect of the present disclosure comprises the membrane electrode assembly of the electrochemical device according to the ninth aspect.

By the structure as described above, compared to the case in the past, the poisoning of the catalyst metal by the ionomer can be suppressed.

In addition, a method for manufacturing an electrode catalyst of an electrochemical device according to an eleventh aspect of the present disclosure comprises: a step of supporting catalyst metal particles in mesopores of a mesoporous material, the mesopores having a mode radius of 1 to 25 nm and a pore volume of 1.0 to 3.0 cm$^3$/g, and in the step described above, number density of the catalyst metal particles supported in the mesopores is lower at an outer side of the mesoporous material than number density of the catalyst metal particles supported in the mesopores at an inner side thereof.

By the structure as described above, compared to the case in the past, the poisoning of the catalyst metal by the ionomer can be suppressed.

In addition, the method for manufacturing an electrode catalyst of an electrochemical device according to the eleventh aspect of the present disclosure is a method for manufacturing an electrode catalyst before the ionomer is supported.

In addition, according to a method for manufacturing an electrode catalyst of an electrochemical device of a twelfth aspect of the present disclosure, in the method for manufacturing an electrode catalyst of an electrochemical device according to the eleventh aspect, in the supporting step, the number density of the catalyst metal particles supported in the mesopores present in a first region which is a predetermined region from the surface of the mesoporous material to the inside thereof is lower than the number density of the catalyst metal particles supported in the mesopores present in a second region located inside than the first region.

By the structure as described above, compared to the case in the past, the poisoning of the catalyst metal by the ionomer can be suppressed.

In addition, according to a method for manufacturing an electrode catalyst of an electrochemical device of a thirteenth aspect of the present disclosure, in the method for manufacturing an electrode catalyst of an electrochemical device according to the twelfth aspect, the number density of the catalyst metal particles supported in the mesopores in the first region is lower than that in the second region by 6% or more.

By the structure as described above, compared to the case in the past, the poisoning of the catalyst metal by the ionomer can be further suppressed.

In addition, according to a method for manufacturing an electrode catalyst of an electrochemical device of a fourteenth aspect of the present disclosure, in the method for manufacturing an electrode catalyst of an electrochemical device according to any one of the eleventh to the thirteenth aspects, the mesoporous material may have an average particle diameter of 200 nm or more.

By the structure as described above, since the region in which the ionomer intrudes into the mesopores is decreased with respect to the pore volume of the mesopores, the rate of the catalyst metal influenced by the poisoning by the ionomer is decreased. Hence, when the average particle diameter is set to be 200 nm or more, for example, the catalyst activity is believed to be improved as compared to that of a related electrode catalyst layer.

In addition, according to a method for manufacturing an electrode catalyst of an electrochemical device of a fifteenth aspect of the present disclosure, in the method for manufacturing an electrode catalyst of an electrochemical device according to any one of the eleventh to the fourteenth aspects, the mode radius of the mesopores may be 3 to 6 nm.

By the structure as described above, when the mode radius of the mesopores is 3 nm or more, a gas is likely to be supplied into the pores, and when the mode radius thereof is 6 nm or less, the ionomer is not likely to intrude into the pores.

In addition, a method for manufacturing a membrane electrode assembly of an electrochemical device of a sixteenth aspect of the present disclosure comprises: a step of supporting catalyst metal particles in mesopores of a mesoporous material, the mesopores having a mode radius of 1 to 25 nm and a pore volume of 1.0 to 3.0 $cm^3/g$, so that number density of the catalyst metal particles is lower at an outer side of the mesoporous material than number density of the catalyst metal particles supported in the mesopores at an inner side thereof; a step of supporting an ionomer on the mesoporous material on which the catalyst metal particles are supported; and a step of providing an electrode catalyst layer including the mesoporous material on which the catalyst metal particles and the ionomer are supported on an electrolyte membrane.

By the structure as described above, compared to the case in the past, the poisoning of the catalyst metal by the ionomer can be suppressed.

In addition, according to a method for manufacturing a membrane electrode assembly of an electrochemical device of a seventeenth aspect of the present disclosure, in the method for manufacturing a membrane electrode assembly of an electrochemical device of the sixteenth aspect, in the step of supporting catalyst metal particles, the number density of the catalyst metal particles supported in the mesopores present in a first region which is a predetermined region from the surface of the mesoporous material to the inside thereof is lower than the number density of the catalyst metal particles supported in the mesopores present in a second region located inside than the first region.

By the structure as described above, compared to the case in the past, the poisoning of the catalyst metal by the ionomer can be suppressed.

In addition, according to a method for manufacturing a membrane electrode assembly of an electrochemical device of an eighteenth aspect of the present disclosure, in the method for manufacturing a membrane electrode assembly of an electrochemical device according to the seventeenth aspect, the number density of the catalyst metal particles supported in the mesopores in the first region is lower than that in the second region by 6% or more.

By the structure as described above, compared to the case in the past, the poisoning of the catalyst metal by the ionomer can be further suppressed.

In addition, according to a method for manufacturing a membrane electrode assembly of an electrochemical device of a nineteenth aspect of the present disclosure, in the method for manufacturing a membrane electrode assembly of an electrochemical device according to any one of the sixteenth to the eighteenth aspects, the mesoporous material may have an average particle diameter of 200 nm or more.

By the structure as described above, since the region in which the ionomer intrudes into the mesopores is decreased with respect to the pore volume of the mesopores, the rate of the catalyst metal influenced by the poisoning by the ionomer is decreased. Hence, when the average particle diameter is set to be 200 nm or more, for example, the catalyst activity is believed to be improved as compared to that of a related electrode catalyst layer.

In addition, according to a method for manufacturing a membrane electrode assembly of an electrochemical device of a twentieth aspect of the present disclosure, in the method for manufacturing a membrane electrode assembly of an electrochemical device according to any one of the sixteenth to the nineteenth aspects, the mode radius of the mesopores may be 3 to 6 nm.

By the structure as described above, when the mode radius of the mesopores is 3 nm or more, a gas is likely to be supplied into the pores, and when the mode radius thereof is 6 nm or less, the ionomer is not likely to intrude into the pores.

Hereinafter, an embodiment of the present disclosure will be described with reference to the drawings. In addition, hereinafter, constituent members equivalent or corresponding to each other are designated by the same reference numeral all through the drawings, and description thereof may be omitted in some cases.

Embodiment

As an electrochemical device according to an embodiment of the present disclosure, although a fuel cell will be described by way of example, the electrochemical device is not limited to a fuel cell and may also be a water electrolysis device which electrolyzes water to produce hydrogen and oxygen.

[Membrane Electrode Assembly]

Figure 2:
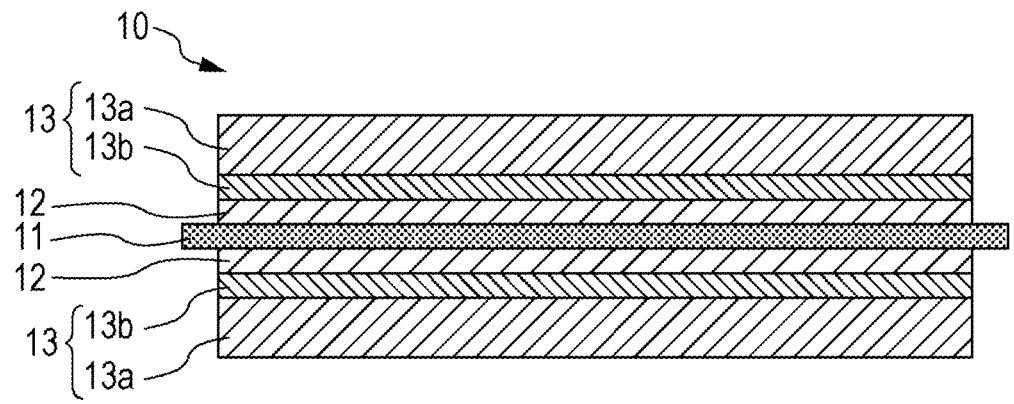
FIG. 2 is a schematic view showing one example of the structure of a membrane electrode assembly of an electrochemical device according to an embodiment of the present disclosure.

First, with reference to FIG. 2, the structure of a membrane electrode assembly (MEA) 10 of an electrochemical device according to the present disclosure will be described. FIG. 2 is a schematic view showing one example of the structure of the membrane electrode assembly (MEA) 10 of the electrochemical device according to the embodiment of the present disclosure.

As shown in FIG. 2, the membrane electrode assembly (MEA) 10 includes a polymer electrolyte membrane 11, a fuel electrode (anode), and an air electrode (cathode), each electrode having an electrode catalyst layer 12 and a gas diffusion layer 13, and the structure is formed so that the fuel electrode and the air electrode are provided so as to sandwich the polymer electrolyte membrane 11 at two sides thereof facing each other. That is, as shown in FIG. 2, a pair of electrode catalyst layers 12 is formed on the two sides of the polymer electrolyte membrane 11, and furthermore, a pair of gas diffusion layers 13 is disposed so as to sandwich the pair of electrode catalyst layers 12.

(Polymer Electrolyte Membrane)

Since the polymer electrolyte membrane 11 performs ion (proton) conduction between the air electrode and the fuel electrode and is required to have both a proton conductivity and a gas barrier property, as the polymer electrolyte membrane 11, for example, there may be mentioned an ion exchange fluorine-based resin membrane or an ion exchange hydrocarbon-based resin membrane. In particular, since having a high proton conductivity and being stably present, for example, in a power generation environment of a fuel cell, a perfluorosulfonic acid resin membrane is preferable. The ion exchange capacity of the ion exchange resin is preferably 0.9 to 2.0 milliequivalent/g of dry resin. When the ion exchange capacity is 0.9 milliequivalent/g of dry resin or more, a high proton conductivity is likely to be obtained, and when the ion exchange capacity is 2.0 milliequivalent/g of dry resin or less, it is preferable since swelling of the resin by water absorption is suppressed, and the change in dimension of the polymer electrolyte membrane 11 can be suppressed. In addition, the film thickness of the polymer electrolyte membrane 11 is preferably 5 to 50 μm. When the film thickness thereof is 5 μm or more, a high gas barrier property can be obtained, and when the film thickness is 50 μm or less, a high proton conductivity can be obtained.

(Gas Diffusion Layer)

The gas diffusion layer 13 is a layer simultaneously having an electricity collection function, a gas permeability, and a hydrophobic property and, as shown in FIG. 2, may have the structure including two layers, that is, a base material 13a and a coating layer 13b. As the base material 13a, a material having an excellent electrical conductivity and an excellent gas/liquid permeability may be used, and for example, there may be mentioned a porous material, such as carbon paper, carbon fiber cloth, or carbon fiber felt. The coating layer 13b is present between the base material 13a and the electrode catalyst layer 12 and is a layer to decrease the contact resistance therebetween and to improve a liquid permeability (drainage). The coating layer 13b is formed, for example, using an electrically conductive material, such as carbon black, and a hydrophobic resin, such as a polytetrafluoroethylene (PTFE), as a primary component.

(Electrode Catalyst Layer)

The electrode catalyst layer 12 is a layer to increase the rate of an electrochemical reaction of an electrode. The electrode catalyst layer 12 contains mesoporous carbon, catalyst metal particles, and an ionomer (proton conductive resin), and the catalyst metal particles are supported at least in the mesoporous carbon. In addition, in the embodiment of the present disclosure, as a mesoporous material used for the electrode catalyst layer 12, although mesoporous carbon will be described by way of example, the mesoporous material is not limited to this mesoporous carbon. As long as the mode radius and the pore volume are the same as those described above, another mesoporous material may also be used. As the another mesoporous material other than the mesoporous carbon, for example, there may be mentioned a mesoporous material formed of an oxide of titanium, tin, niobium, tantalum, zirconium, aluminum, or silicon.

Before supporting the catalyst metal particles, the mesoporous carbon according to the embodiment of the present disclosure may include mesopores having a mode radius of 1 to 25 nm and a pore volume of 1.0 to 3.0 $cm^3/g$. When the pore volume of the mesopores is 1.0 $cm^3/g$ or more, a large amount of catalyst metal can be supported in the mesoporous carbon, and when the pore volume of the mesopores is 3.0 $cm^3/g$ or less, the strength of the mesoporous carbon is increased as a structural body.

Furthermore, in the mesoporous carbon according to the embodiment of the present disclosure, the mode radius of the mesopores may be set to be 3 to 6 nm. In particular, the mode radius of the mesopores may be set to 3 to 4 nm. When the mode radius of the mesopores is 3 nm or more, a gas is likely to be supplied into the pores, and when the mode radius thereof is 6 nm or less, the ionomer is not likely to intrude into the pores.

Furthermore, the mesoporous carbon according to the embodiment of the present disclosure may be formed to have an average particle diameter 200 to 1,000 nm. When the average particle diameter of the mesoporous carbon is 200 nm or more, since the region in which the ionomer intrudes into the mesopores is decreased with respect to the pore volume of the mesopores, the rate of the catalyst metal influenced by the poisoning by the ionomer is decreased. Hence, when the average particle diameter of the mesoporous carbon is set to 200 nm or more, for example, the catalyst activity is believed to be improved as compared to that of a related electrode catalyst layer.

In addition, when the average particle diameter of the mesoporous carbon is 1,000 nm or less, a reaction gas is likely to be supplied to the catalyst metal particles supported in the mesoporous carbon. Furthermore, as described later, when the average particle diameter of the mesoporous carbon is 800 nm or less, oxygen in an amount similar to or larger than that for a related electrode catalyst can be supplied to the catalyst metal particles.

In addition, the pore volume and the mode radius of the mesopores included in the mesoporous carbon described above can be obtained by measurement by a nitrogen adsorption method, followed by analysis using a method, such as Barrett-Joyner-Halenda (BJH) method, a density functional theory (DFT) method, or a quenched solid density functional theory (QSDFT) method.

In addition, the average particle diameter of the mesoporous carbon may be measured using a laser diffraction type particle size distribution measurement device in the state in which the mesoporous carbon is dispersed in a solvent or may be observed using a scanning electron microscope (SEM) or a transmission electron microscope (TEM). When the particle size distribution is measured after the mesoporous carbon is dispersed in a solvent, mesoporous carbon particles are required to be not aggregated with each other. Accordingly, as the solvent, water, an alcohol, or a mixed solvent containing water and an alcohol is preferably used. Furthermore, in order to improve the dispersibility, a dispersion agent is preferably added to the solvent. As the dispersion agent, for example, a perfluorosulfonic acid resin, a poly(oxyethylene)octyl phenyl ether, or a poly(oxyethylene)sorbitan monolaurate may be mentioned. In order to further improve the dispersibility, after the solvent and the mesoporous carbon are mixed together, a dispersion treatment is preferably performed. As a dispersion treatment device, for example, there may be mentioned an ultrasonic homogenizer, a wet type jet mill, a ball mill, or a mechanical stirring device.

In addition, although a method for manufacturing mesoporous carbon contained in the electrode catalyst layer 12 according to the embodiment of the present disclosure is not particularly limited, for example, the method disclosed in one of International Publication Nos. 2014/175106 and 2014/185498 may be preferably used. The mesoporous carbon manufactured by the method as described above includes mesopores having a large pore volume and has the structure in which the mesopores communicate with each other.

Hence, the catalyst metal particles are likely to be supported in the pores, and a gas is likely to be supplied to the catalyst metal particles thus supported. In addition, in order to adjust the average particle diameter of the mesoporous carbon, a pulverizing treatment may be performed after the synthesis. As a pulverizing method, for example, there may be mentioned a wet bead mill, a dry bead mill, a wet ball mill, a dry ball mill, a wet jet mill, or a dry jet mill. Among those mills mentioned above, a wet bead mill is appropriate since pulverization is likely to be performed to obtain particles having a fine particle diameter.

As the catalyst metal contained in the electrode catalyst layer 12, for example, there may be mentioned platinum (Pt), ruthenium (Ru), palladium (Pd), iridium (Ir), silver (Ag), or gold (Au). Platinum and its alloy are appropriate since a catalyst activity to an oxygen reduction reaction is high, and the durability in a power generation environment of a fuel cell is excellent. In addition, the catalyst metal may also be in the form of particles. The average particle diameter of the catalyst metal may be set, for example, to 1 to 20 nm and furthermore may also be set to 1 to 10 nm. When the average particle diameter of the catalyst metal particles is 10 nm or less, the surface area of the catalyst metal per weight is increased, and the reactivity thereof is improved. In addition, when the average particle diameter of the catalyst metal particles is 1 nm or more, the stability of the fine particle is improved, and for example, the metal is not likely to be fused in the power generation environment of a fuel cell.

In addition, the ratio of the weight of the catalyst metal to the weight of the mesoporous carbon may be 0.65 to 1.5. When the amount of the catalyst metal per unit area of the mesoporous carbon is increased, and the weight ratio of the catalyst metal is increased out of the range of the weight ratio described above, the catalyst metal particles may be unfavorably aggregated with each other in some cases. On the other hand, when the amount of the catalyst metal per unit area of the mesoporous carbon is decreased, and the weight ratio of the catalyst metal is decreased out of the range of the weight ratio described above, in order to secure a necessary amount of the catalyst metal, the amount of the mesoporous carbon is increased, and as a result, the thickness of the electrode catalyst layer 12 may be increased in some cases.

As the ionomer (proton conductive resin), an ion exchange resin may be used. In particular, a perfluorosulfonic acid resin is preferable since having a high proton conductivity and being stably present even in the power generation environment of a fuel cell. The ion exchange capacity of the ion exchange resin may be set to 0.9 to 2.0 milliequivalent/g of dry resin. When the ion exchange capacity is 0.9 milliequivalent/g of dry resin or more, a high proton conductivity is likely to be obtained, and when the ion exchange capacity is 2.0 milliequivalent/g of dry resin or less, the resin is suppressed from swelling by water absorption, and the gas diffusion property in the electrode catalyst layer 12 is not likely to be disturbed.

In addition, the ratio of the weight of the ionomer to the total weight of carbon contained in the electrode catalyst layer 12 may be 0.7 to 0.9. In this carbon, the mesoporous carbon is contained, and furthermore, at least one of carbon black and carbon nanotubes, which will be described later, may also be contained.

In order to improve the drainage, to the electrode catalyst layer 12, carbon black or carbon nanotubes may be added. In this case, in general, an electrode catalyst layer which contains carbon particles having an average particle diameter 10 to 100 nm as the carbon described above is able to obtain a high drainage by a capillary force. However, since the average particle diameter of the mesoporous carbon used for the electrode catalyst layer 12 according to the embodiment of the present disclosure is 200 nm or more, the drainage may cause a problem in some cases. Hence, the structure in which at least one of carbon black and carbon nanotubes is added to the electrode catalyst layer 12 may also be used. When the structure is formed as described above, the drainage of the electrode catalyst layer 12 can be improved, and hence the power generation performance of the fuel cell can be improved.

In addition, as the carbon black, for example, there may be mentioned Ketjen black, acetylene black, Vulcan, or black pearl. As the carbon nanotubes, for example, there may be mentioned monolayer carbon nanotubes or multilayer carbon nanotubes. Since aggregates are linearly developed, Ketjen black is preferable since effective drainage paths can be formed in the electrode catalyst layer 12 with a small addition amount.

As a method to form the electrode catalyst layer 12 according to the embodiment of the present disclosure, for example, a method which has been generally used for a fuel cell may be used. For example, the materials described above are dispersed in water or a solvent containing an alcohol and are then applied on a base material, such as a polymer electrolyte membrane, a gas diffusion layer, or one of various transfer films, followed by drying, so that the electrode catalyst layer 12 is formed. In addition, according to the embodiment of the present disclosure, as a method for manufacturing the electrode catalyst layer 12 containing the mesoporous carbon, the catalyst metal particles supported at least in the mesoporous carbon, and the ionomer, the following steps may be included. That is, the method may include a step of preparing mesoporous carbon which includes mesopores having a mode radius of 1 to 25 nm and a pore volume of 1.0 to 3.0 cm$^3$/g and which has an average particle diameter 200 nm or more, a step of forming a catalyst by supporting the catalyst metal particles in the mesoporous carbon, a step of forming a catalyst ink by mixing the catalyst, a solvent, and the ionomer, and a step of applying the catalyst ink to a base material.

In addition, the electrode catalyst layer 12 according to the embodiment of the present disclosure which has the structure described above may be used as an air electrode (cathode) side electrode catalyst layer. In addition, the electrode catalyst layer 12 described above may also be used as a fuel electrode (anode) side electrode catalyst layer. Alternatively, the fuel electrode side electrode catalyst layer may have the structure similar to that of a related electrode catalyst layer which has been generally used in the membrane electrode assembly 10 of the fuel battery. That is, in the membrane electrode assembly 10, it is appropriate that the electrode catalyst layer 12 having the structure as described above is used at least as the air electrode side electrode catalyst layer.

In addition, when the fuel electrode side electrode catalyst layer is formed to have the structure similar to that of a related electrode catalyst layer, the fuel electrode side electrode catalyst layer may be formed as described below. For example, a platinum catalyst supported on carbon black and a perfluorosulfonic acid resin are dispersed in water or a solvent containing an alcohol and are then applied on a base material, such as a polymer electrolyte membrane, a gas diffusion layer, or one of various transfer films, followed by drying, so that the electrode catalyst layer can be formed.

The polymer electrolyte membrane 11, the pair of electrode catalyst layers 12 (the cathode electrode catalyst layer and the anode electrode catalyst layer), and the pair of gas diffusion layers 13 (the cathode gas diffusion layer and the anode gas diffusion layer) are integrated, so that the membrane electrode assembly (MEA) 10 according to the embodiment of the present disclosure can be obtained.

Figure 3:
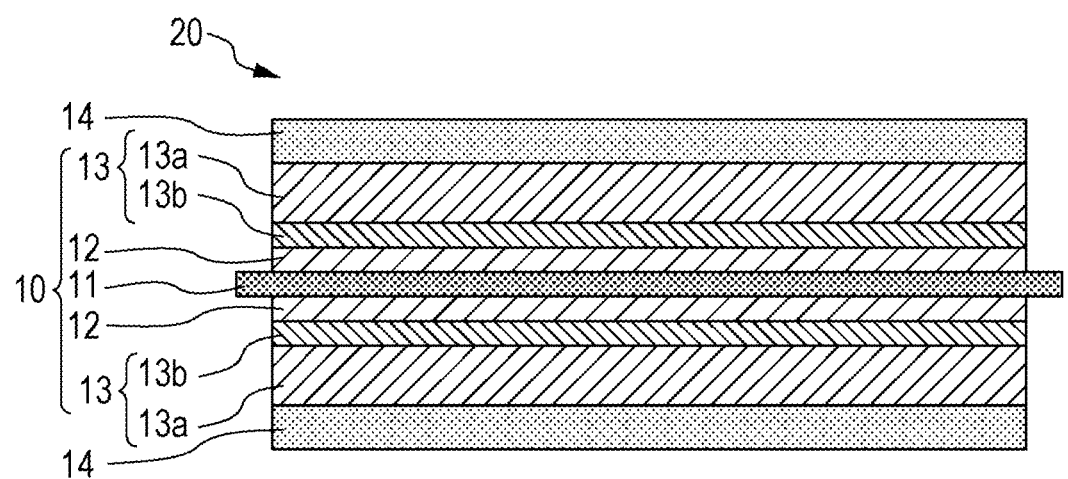
FIG. 3 is a schematic view showing one example of the structure of a single cell of a fuel battery using the membrane electrode assembly shown in FIG. 2.

In addition, as shown in FIG. 3, the two sides of the membrane electrode assembly 10 shown in FIG. 2 are sandwiched with a pair of separators 14 each also functioning as a supply path of a reaction gas (hydrogen or oxygen), so that a single cell 20 can be formed. In addition, when the single cells 20 thus formed are integrally assembled, for example, a fuel battery stack can be formed. In addition, FIG. 3 is a schematic view showing one example of the structure of the single cell 20 of the fuel cell using the membrane electrode assembly 10 shown in FIG. 2.

Example

Hereinafter, an example according to the present disclosure will be described.
(Formation of Electrode Catalyst)

A commercially available mesoporous carbon (CNovel, manufactured by Toyo Tanso Co., Ltd.) having a designed pore diameter of 10 nm was charged in a mixed solvent containing water and ethanol at an equal weight ratio, so that a slurry having a solid component concentration of 1 percent by weight was prepared. After zirconia beads having a diameter of 0.5 mm were charged in this slurry, by using a medium stirring type wet bead mill (Labstar Mini, manufactured by Ashizawa Finetech Ltd.), a pulverization treatment was performed at a circumference rate of 12 m/s for 20 minutes. After the zirconia beads were recovered from the slurry processed by the pulverization treatment, and the solvent was evaporated, an aggregate thus obtained was ground using a mortar, so that a carbon carrier was formed.

Next, 1 g of the carbon carrier thus obtained was charged in 400 mL of a mixed solvent containing water and ethanol at a ratio of 1:1 (weight ratio), and ultrasonic dispersion was performed for 15 minutes. After the dispersion was performed, while stirring was performed in a nitrogen atmosphere, a dinitrodiamine platinum nitric acid solution at a concentration of 14 percent by weight was dripped to the carbon carrier so that the concentration of platinum was 50 percent by weight with respect to the carbon carrier, and heating and stirring were performed at 80° C. for 6 hours. After spontaneous cooling, filtration washing was performed, and drying was performed at 80° C. for 15 hours. After an aggregate thus obtained was ground using a mortar, a heat treatment was performed at 220° C. for 2 hours in an atmosphere containing nitrogen and hydrogen at a ratio of 85:15, so that an electrode catalyst was formed. In addition, the method for forming an electrode catalyst described above is one example, and as long as the number density of platinum particles supported in the mesopores is lower at an outer side of the mesoporous carbon than that at an inner side thereof, any method may also be used.

Comparative Example

Hereinafter, a comparative example of the present disclosure will be described.
(Formation of Electrode Catalyst)

Except for that the composition of the mixed solvent used when the Pt particles were supported in the carbon carrier was set so that water and ethanol were contained at a ratio of 3:1 (weight ratio), an electrode catalyst of a comparative example was formed in a manner similar to that of the electrode catalyst of the example.
[Evaluation of Catalyst Activity and Electrochemical Active Surface Area]

The catalyst activity and the electrochemical active surface area of the electrode catalyst of each of the example and the comparative example were evaluated by the following procedure.

Ketjen black (EC300J, manufactured by Lion Specialty Chemicals Co., Ltd.), the weight of which was ½ of the weight of the mesoporous carbon contained in the electrode catalyst, was charged in a mixed solvent containing water and ethanol at an equal weight ratio, followed by stirring. To a slurry thus obtained, an ionomer (Nafion, manufactured by du Pont) was charged so as to have a weight ratio of 0.8 with respect to the total carbon (mesoporous carbon+Ketjen black), and an ultrasonic dispersion treatment was then performed. A catalyst ink obtained as described above was applied on a polymer electrolyte membrane (Gore-Select III, manufactured by Gore Japan) by a spray method, so that an electrode catalyst layer was formed.

Subsequently, the electrode catalyst layer described above was used as a cathode catalyst layer, and an anode catalyst layer was formed on a main surface of the polymer electrolyte membrane opposite to the main surface on which the cathode catalyst layer was provided.

The anode catalyst layer was formed by the following method. First, a commercially available platinum-supporting carbon black catalyst (TEC10E50E, manufactured by Tanaka Kikinzoku Kogyo K. K.) was charged in a mixed solvent containing water and ethanol at an equal weight ratio, followed by stirring. To a slurry thus obtained, an ionomer (Nafion, manufactured by du Pont) was charged to have a weight ratio of 0.8 with respect to the carbon, and an ultrasonic dispersion treatment was performed. A catalyst ink obtained as described above was applied by a spray method on a main surface of the polymer electrolyte membrane opposite to the main surface on which the cathode catalyst layer was provided, so that the anode catalyst layer was formed.

On each of the cathode catalyst layer and the anode catalyst layer formed as described above, a gas diffusion layer (GDL25BC, manufactured by SGL Carbon Japan Co., Ltd.) was disposed, and a pressure of 7 kgf/cm$^2$ was applied thereto for 5 minutes in a high temperature atmosphere at 140° C., so that a membrane electrode assembly was formed.

The membrane electrode assembly thus obtained was sandwiched by separators, in each of which a flow path having a serpentine shape was provided, and was then fitted in a predetermined jig, so that a fuel battery cell was formed.

While the temperature of the fuel battery cell thus obtained was maintained at 80° C., hydrogen having a dew point of 80° C. and oxygen having a dew point of 80° C. were allowed to flow at an anode side and a cathode side, respectively, at flow rates each of which is sufficiently larger than the amount to be consumed by an electrochemical reaction (oxidation/reduction reaction) of the fuel battery. In this case, by using an electronic load unit (PLZ-664WA, manufactured by Kikusui Electronics Corp.), the voltage of the fuel battery cell was measured during a constant current operation. In addition, during the measurement, the electric resistance of the cell was in-situ measured using a low resistance meter having a fixed frequency of 1 kHz. From the current-voltage curve corrected using an electrical resistance component of the cell, a current at 0.9 V was read and was then normalized by the platinum amount contained in the cathode catalyst layer, so that the index of the catalyst activity was obtained. This index is called a mass activity at 0.9 V and is generally used as an index indicating the catalyst activity of the fuel battery.

Subsequently, the temperature of the fuel battery cell was maintained at 80° C., and hydrogen having a dew point of 80° C. and a nitrogen having a dew point of 80° C. were supplied to the anode side and the cathode side, respectively. After a working electrode of a potentio/galvanostat (HZ-3000, manufactured by Hokuto Denko Corp.) was connected to the cathode, and a counter electrode and a reference electrode were connected to the anode, cyclic voltammetry was measured, so that the electric amount derived from the hydrogen absorption of Pt was measured. The electric amount thus obtained was divided by the theoretical value (0.21 mC/cm$^2$) of the electric amount of hydrogen absorption per Pt unit surface area, so that the electrochemical active surface area was calculated.

[Evaluation of Degree of Pt Enclosure]

The distribution of Pt particles in the mesoporous carbon of the cathode catalyst of each of the example and the comparative example was evaluated by the following procedure.

Figure 4:
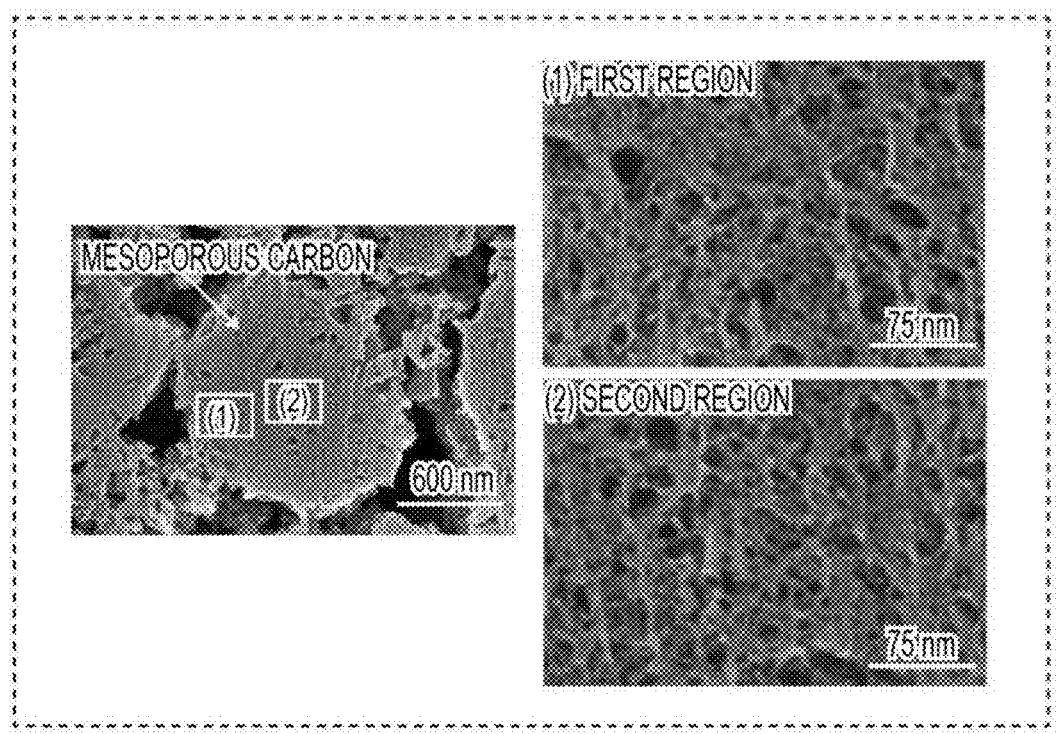
FIG. 4 includes cross-sectional SEM images each showing a cathode catalyst layer which uses the electrode catalyst of the example.
Figure 5:
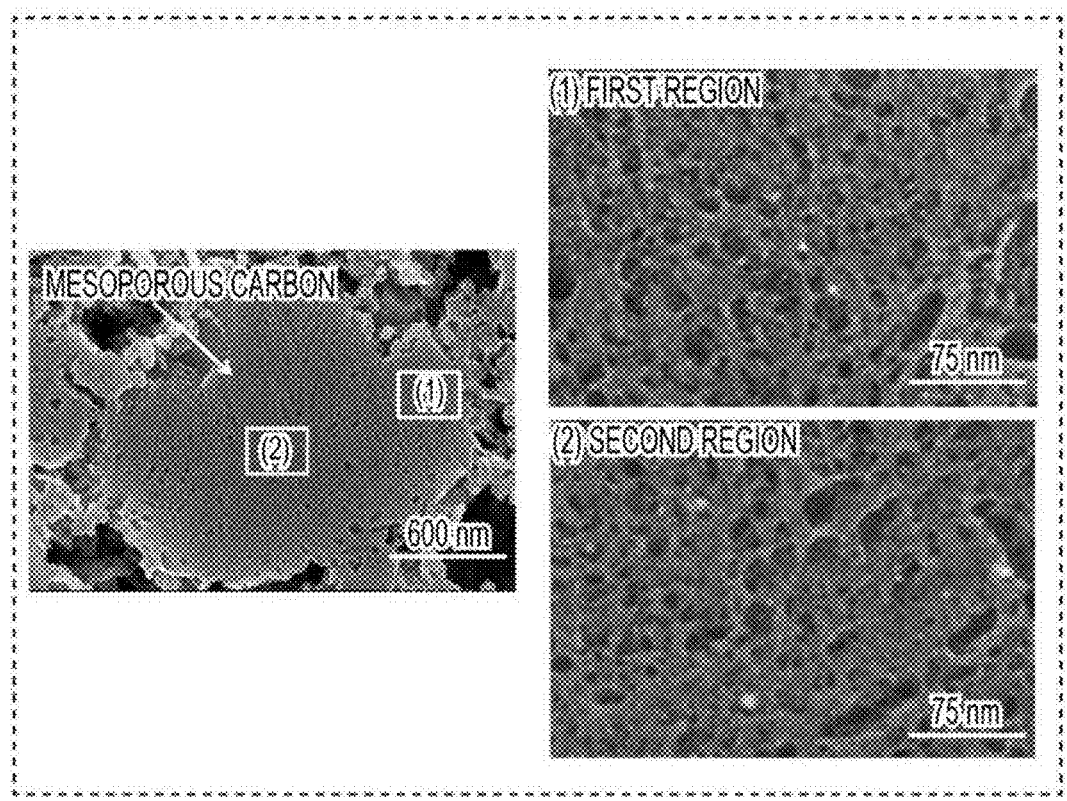
FIG. 5 includes cross-sectional SEM images each showing a cathode catalyst layer which uses the electrode catalyst of the comparative example.

The membrane electrode assembly was processed by argon/broad ion beams, and the cross-section of the cathode catalyst layer was observed by a scanning electron microscope (S-5500, manufactured by Hitachi High-Technologies Corp.). FIGS. 4 and 5 include cross-sectional SEM images of the cathode catalyst layers using the electrode catalysts of the example and the comparative example, respectively. As shown in FIGS. 4 and 5, a first region and a second region, which are cross-sections, of mesoporous carbon were each observed at a magnification of 400,000 times, and the number of Pt particles contained in the viewing field was counted with eyes. In FIGS. 4 and 5, the Pt particle is shown by a white circle. In addition, the first region is a predetermined region from the surface of the mesoporous carbon to the inside thereof, and the second region is a region located inside than the first region. In addition, the first region does not include the surface of the mesoporous carbon.

The value obtained by dividing the number of Pt particles in the second region by the number of Pt particles in the first region was defined as the degree of Pt enclosure. A degree of Pt enclosure of more than 1 indicates that the number density of Pt particles is higher in the second region of the mesoporous carbon than that in the first region thereof.

[Evaluation of Degree of Ionomer Intrusion]

The degree of ionomer intrusion into the mesoporous carbon of the cathode catalyst layer of the example was evaluated by the following procedure.

While being placed in a cryogenic state, the membrane electrode assembly was processed by focused ion beams, and the cross-section of the cathode catalyst layer was observed using a scanning transmission electron microscope (JEM-ARM200F, manufactured by JEOL Ltd.) and an energy dispersive X-ray spectroscopic method (detector: JED2300, manufactured by JEOL Ltd.). In addition, in order to reduce the sample damage caused by electron beam irradiation, the electron microscopic observation was performed in a cryogenic state. In addition, the energy dispersive X-ray spectroscopic observation was also performed in a cryogenic state.

FIG. 6 is a table showing the performance and the physical properties of the cathode catalyst using the electrode catalyst of each of the example and the comparative example. As shown in FIG. 6, the catalyst activity of the cathode catalyst of the example is approximately 1.3 times that of the cathode catalyst of the comparative example. However, since the electrochemical active surface areas of the two cathode catalysts are approximately equal to each other, from the electrochemical active surface area, the difference in catalyst activity therebetween cannot be explained. On the other hand, the degree of Pt enclosure of the cathode catalyst of the example is approximately 1.3 times that of the cathode catalyst of the comparative example, and hence, it is found that the degree of Pt enclosure and the catalyst activity have a high correlation therebetween. In this case, the reason the degree of Pt enclosure of the example is higher than that of the comparative example is believed since the rate of ethanol of the mixed solvent which is used when the Pt particles are supported is high. Since the surface of the mesoporous carbon is basically hydrophobic, the affinity thereof to ethanol is higher than that to water. Hence, it is believed that as the rate of ethanol in the solvent is increased, the solvent is more likely to penetrate in the pores of the mesoporous carbon, and as a result, the Pt particles are supported deeper in the carbon.

Figure 7:
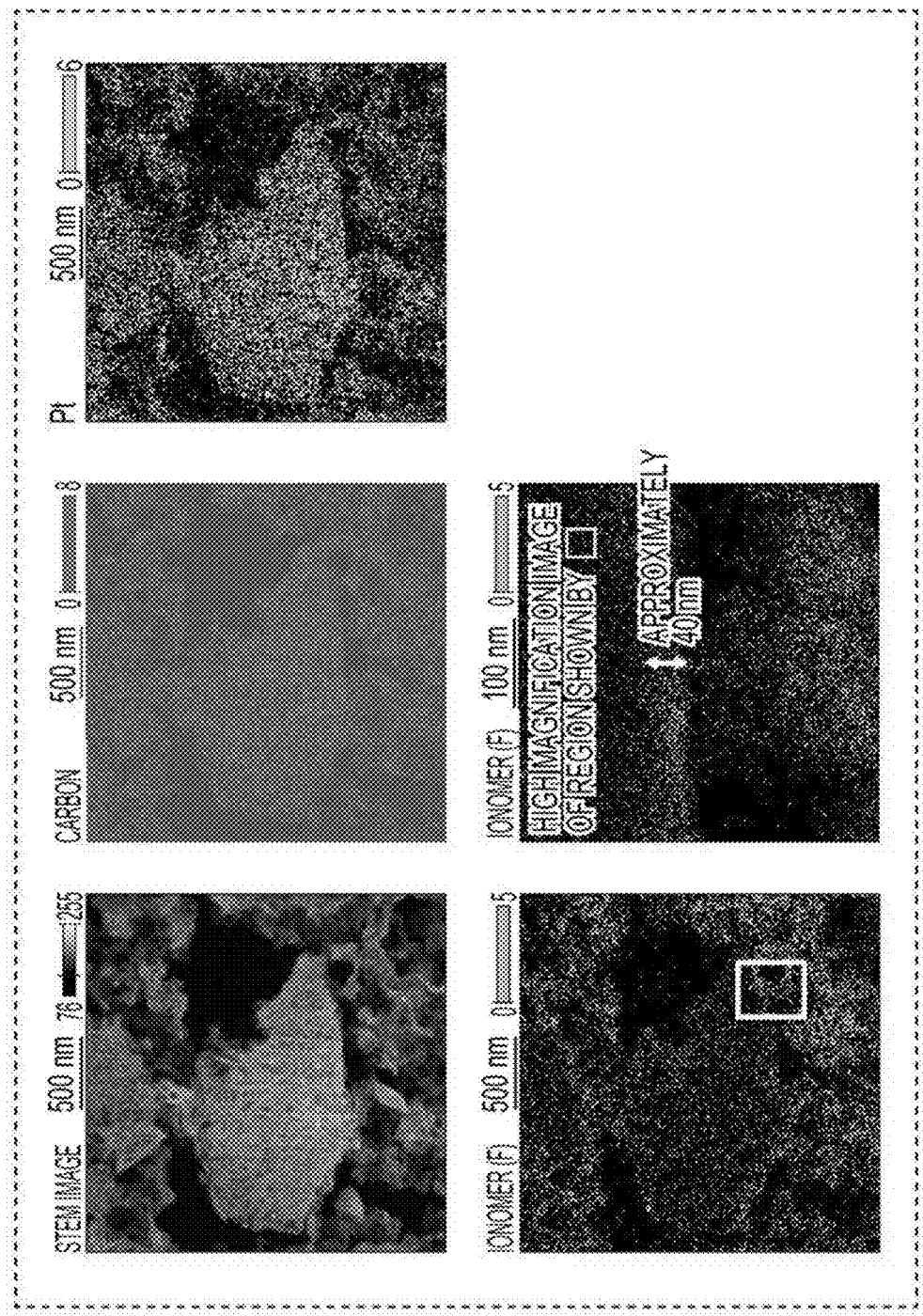
FIG. 7 includes a cross-sectional STEM image and element maps of the cathode catalyst layer using the electrode catalyst of the example.

FIG. 7 includes a cross-sectional image of the cathode catalyst layer of the example by a scanning transmission electron microscope (STEM) and element maps by an energy dispersive X-ray spectroscopy. Carbon and Pt were detected both in the first region and the second region of the mesoporous carbon. On the other hand, although fluorine derived from the ionomer was detected in the first region of the mesoporous carbon, fluorine was not so much detected in the second region. Furthermore, as a result of high magnification observation, in a region from the surface of the mesoporous carbon to a depth of approximately 40 nm, it was found that fluorine was intensively detected. That is, it is believed that the ionomer intruded into the region from the surface of the mesoporous carbon to a depth of approximately 40 nm, and the Pt particles contained in this region were influenced by catalyst poisoning. Hence, it is believed that a catalyst in which the number density of Pt particles is lower at the outer side of the mesoporous carbon than that at the inner side thereof has a high catalyst activity. In addition, from the results described above, the predetermined region defining the first region may include a region in which the ionomer intrudes into the inside (mesopores). For example, the region described above may be a region including a region from the surface of the mesoporous carbon to a depth of 40 nm.

From the description described above, various improvements and other embodiments of the present disclosure are apparent to a person skilled in the art. Hence, it is to be understood that the above description is provided as an example to show the best mode of carrying out the present disclosure to a person skilled in the art. Without departing from the spirit of the present disclosure, the details of the structure and/or the function thereof may be substantially changed and/or modified.

The present disclosure is useful, for example, for an electrode catalyst to be used for a membrane electrode assembly which forms a fuel battery cell.

What is claimed is:

1. An electrode catalyst of an electrochemical device, comprising:
   a mesoporous material; and
   catalyst metal particles supported at least in the mesoporous material, wherein before supporting the catalyst metal particles, the mesoporous material includes mesopores having a mode radius of 1 to 25 nm and a pore volume of 1.0 to 3.0 cm$^3$/g, number density of the catalyst metal particles supported in the mesopores is lower at a first region of the mesoporous material than number density of the catalyst metal particles supported at a second region of the mesoporous material, the mesoporous material comprises a surface and an internal boundary, the first region is a region between the surface of the mesoporous material and the internal boundary in the mesoporous material, and does not include the surface of the mesoporous material, a distance from the surface of the mesoporous material to the internal boundary in the mesoporous material is 40 nm, and the second region is a region of the mesoporous material inside the internal boundary.

2. The electrode catalyst of the electrochemical device according to claim 1, wherein the number density of the catalyst metal particles supported in the mesopores in the first region is lower than that in the second region by 6% or more.

3. The electrode catalyst of the electrochemical device according to claim 1, wherein the mesoporous material has an average particle diameter of 200 nm or more.

4. The electrode catalyst of the electrochemical device according to claim 1, wherein the mode radius of the mesopores is 3 to 6 nm.

5. An electrode catalyst layer comprising:

the electrode catalyst according to claim 1; and an ionomer.

6. The electrode catalyst layer according to claim 5, further comprising at least one material selected from the group consisting of carbon black and carbon nanotubes.

7. The electrode catalyst layer according to claim 5, wherein the mesoporous material includes mesoporous carbon, and the ratio of the weight of the ionomer contained in the electrode catalyst to the total weight of carbon including the mesoporous carbon is 0.7 to 0.9.

8. A membrane electrode assembly comprising:

a polymer electrolyte membrane; and a fuel electrode and an air electrode which are provided on two sides of the polymer electrolyte membrane and each of which includes an electrode catalyst layer and a gas diffusion layer, wherein the electrode catalyst layer of the air electrode at least includes the electrode catalyst layer of the electrochemical device according to claim 5.

9. An electrochemical device comprising:

the membrane electrode assembly according to claim 8.

* * * * *